United States Patent
Kamatani

(10) Patent No.: US 6,839,192 B2
(45) Date of Patent: Jan. 4, 2005

(54) HOLDER FOR MAGNETIC TRANSFER APPARATUS

(75) Inventor: Akito Kamatani, Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 129 days.

(21) Appl. No.: 10/387,569

(22) Filed: Mar. 14, 2003

(65) Prior Publication Data

US 2003/0174425 A1 Sep. 18, 2003

(30) Foreign Application Priority Data

Mar. 15, 2002 (JP) .......................................... 2002-072284

(51) Int. Cl.⁷ ................................................. G11B 5/86
(52) U.S. Cl. ............................. 360/17; 360/16; 360/15; 428/694 SG
(58) Field of Search .............................. 360/15, 16, 17, 360/48, 97.02, 97.03, 97.04; 428/694 SG, 65.3

(56) References Cited

U.S. PATENT DOCUMENTS 6,347,016 B1   2/2002   Ishida et al.

FOREIGN PATENT DOCUMENTS

| EP | 0 915 456 A1 | 5/1999 |
| EP | 1 205 915 A2 | 5/2002 |
| EP | 1 209 668 A2 | 5/2002 |
| EP | 1 251 495 A2 | 10/2002 |
| JP | 63-183623 | 7/1988 |
| JP | 2001-256644 | 9/2001 |

*Primary Examiner*—Sinh Tran
*Assistant Examiner*—Natalia Figueroa
(74) *Attorney, Agent, or Firm*—Sughrue Mion, PLLC

(57) ABSTRACT

A holder for magnetic transfer is formed by a chamber base and a chamber body which are moved toward and away from each other and form therebetween an inner space in which a master information carrier and a slave medium are accommodated and held in close contact with each other. The holder is provided at different parts with a first sealing portion for sealing the inner space between the chamber base and the chamber body and a second sealing portion allowing the pressing faces of the chamber base and the chamber body to move toward each other to press the master information carrier and the slave medium against each other with the inner space kept sealed.

7 Claims, 2 Drawing Sheets

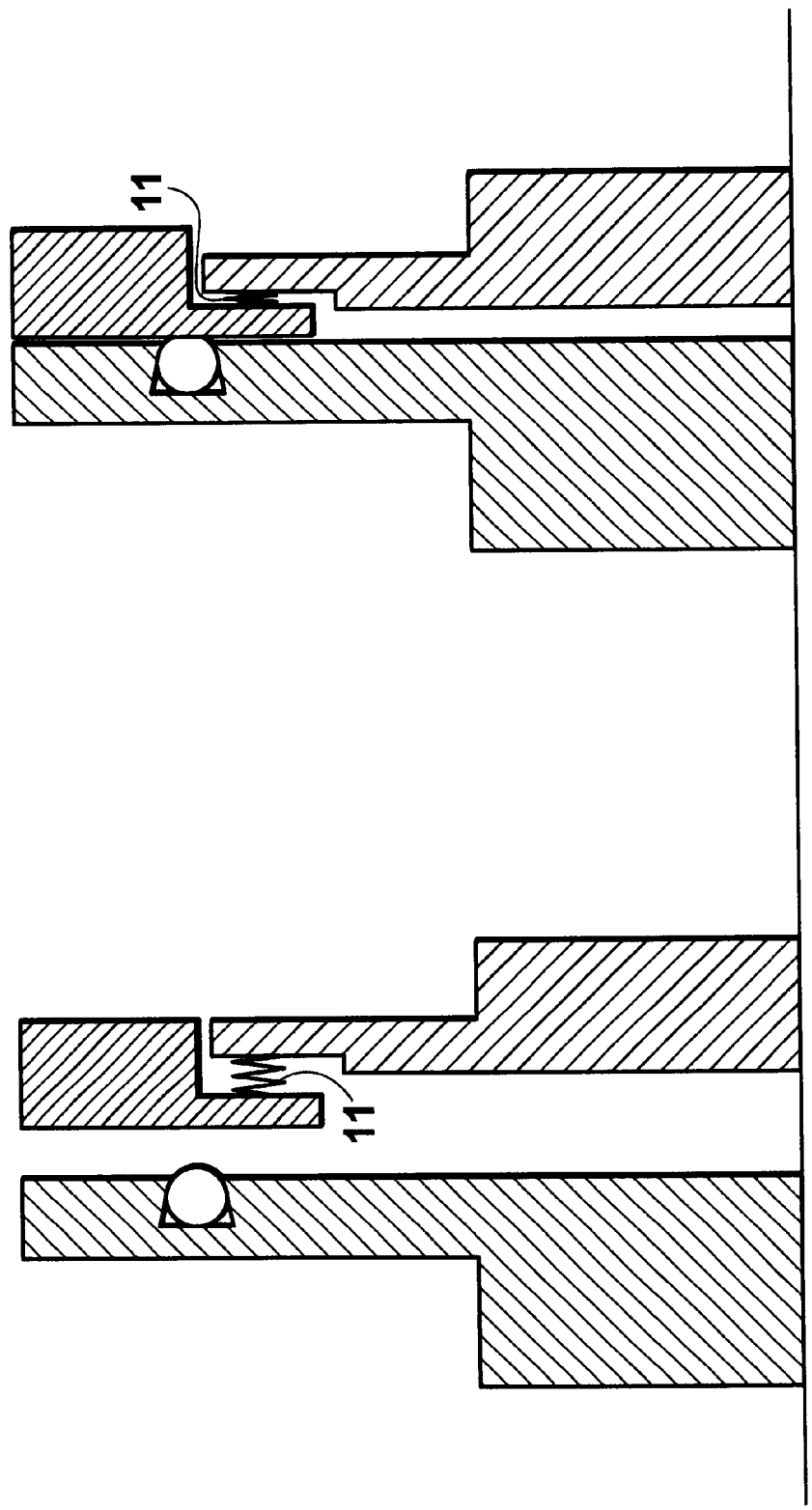

HOLDER FOR MAGNETIC TRANSFER
APPARATUS

BACKGROUND OF THE INVENTION

1. Field of the Invention

This invention relates to a holder for a magnetic transfer apparatus for magnetically transferring information carried by a master information carrier to a slave medium, and more particularly to a holder which accommodates therein the master information carrier and the slave medium and holds them in close contact with each other.

2. Description of the Related Art

There has been known a magnetic transfer in which a patterned master information carrier provided with an irregularity pattern or an embedded pattern representing the signals (e.g., servo signals) to be transferred and with a magnetic layer formed on at least the top surface of the irregularity pattern or the embedded pattern is brought into close contact with a slave medium, and a transfer magnetic field is applied to the slave medium and the patterned master information carrier, thereby transferring the signals to the slave medium, as disclosed, for instance, in Japanese Unexamined Patent Publication Nos. 63(1988)-183623 and 2001-256644, and U.S. Pat. No. 6,347,016.

In the case where the slave medium is a disc such as a hard disc or a high-density flexible disc, a disc-like master information carrier is brought into close contact with one side or each side of the slave medium and the transfer magnetic field is applied to the slave medium/master information carrier assembly (comprising the slave medium and the master information carrier held in close contact with each other) by an electromagnet unit or a permanent magnet unit disposed on one side or each side of the assembly.

In order to obtain a high transfer quality, it is important that the slave medium and the master information carrier are held in close contact with each other over the entire areas thereof with no dust or dirt intervening therebetween. That is, when dust or dirt intervenes between the slave medium and the master information carrier, the slave medium cannot be in close contact with the master information carrier at the portion about the dust or dirt and the magnetic transfer does not occur there, which results in dropout of signals in the transferred magnetic information. When the transferred magnetic information comprises servo signals, dropout of signals deteriorates the tracking function and lowers the reliability.

Since the information carried by a master information carrier is transferred to a number of slave media by repeated use of the master information carrier, when dust or dirt adheres to the surface of the master information carrier, defective transfer occurs in all the subsequent magnetic transfers, and at the worst, the dust or dirt can deform the surface of the master information carrier and damages the regular function of the master information carrier.

In the magnetic transfer, the master information carrier and the slave medium are generally accommodated and held in close contact with each other in a holder comprising a chamber base and a chamber body which are moved toward and away from each other. In order to purge air from between the slave medium and the master information carrier to bring them into closer contact or to bring them into close contact with each other, the inner space of the holder is sometimes sealed and evacuated.

The chamber base and the chamber body are moved toward and away from each other to put the slave media in and out from the inner space of the holder and the pressing faces of the chamber base and the chamber body are moved toward and away from each other to press the slave medium and the master information carrier against each other to bring them in close contact with each other. The inner space of the holder formed between the chamber base and the chamber body should be sealed and the pressing faces of the chamber base and the chamber body must be moved toward and away from each other keeping the inner space sealed each time the magnetic transfer is effected. Conventionally, the inner space of the holder is sealed and is kept sealed during movement of the pressing faces of the chamber base and the chamber body by the same sealing member. However when the inner space of the holder is sealed and is kept sealed during movement of the pressing faces of the chamber base and the chamber body by the same sealing member, the service life of the sealing member is shortened to make it necessary frequent change of the sealing member, which results in deterioration of the working efficiency, and dust or dirt becomes apt to be generated due to wear of the sealing member, which results in defective transfer as described above.

SUMMARY OF THE INVENTION

In view of the foregoing observations and description, the primary object of the present invention is to provide an improved holder for a magnetic transfer apparatus which can improve the durability of the sealing member and prevent generation of dust or dirt, thereby allowing an excellent magnetic transfer to be done at a high efficiency.

In accordance with the present invention, there is provided a holder for magnetic transfer comprising a chamber base and a chamber body which are moved toward and away from each other and form therebetween an inner space in which a master information carrier and a slave medium are accommodated and held in close contact with each other, wherein the improvement comprises that the holder is provided at different parts with a first sealing portion for sealing the inner space between the chamber base and the chamber body and a second sealing portion allowing the pressing faces of the chamber base and the chamber body to move toward each other to press the master information carrier and the slave medium against each other with the inner space kept sealed.

In the first and second sealing portions, a sealing member such as an O-ring may be used. In the second sealing portion allowing the pressing faces of the chamber base and the chamber body to slide toward each other, a magnetic fluid seal which generates no dust or dirt may be employed. A magnetic fluid seal and an O-ring may be employed together.

For example, it is preferred that the chamber body be divided into a pressing disc portion and a side wall portion so that the pressing disc portion slides along the side wall portion toward the chamber base when pressing the slave medium and the master information carrier against each other, the first sealing portion being disposed between the end surface of the side wall portion and the chamber base and the second sealing portion being disposed between the pressing disc portion and the side wall portion of the chamber body. In such a case it is preferred that an urging member be provided to urge the side wall portion toward the chamber base from the pressing disc portion.

In accordance with the present invention, since the holder is provided at different parts with a first sealing portion for sealing the inner space between the chamber base and the chamber body and a second sealing portion allowing the pressing faces of the chamber base and the chamber body to move toward each other to press the master information carrier and the slave medium against each other with the inner space kept sealed, the first sealing portion for sealing the inner space between the chamber base and the chamber body which are moved toward and away from each other each time the information on the master information carrier is transferred to a slave medium may be of a non-slide type and the load on the first sealing portion is lightened, which results in improved durability. Further, since the second sealing portion for sealing the sliding portions is kept in contact with the sliding portions and is not excessively deformed when is reengaged with the sliding portions, the durability of the second sealing portion can be better. Further, wear of the sealing member can be reduced in both the first and second sealing portions and generation of dust or dirt can be suppressed, whereby generation of defective magnetic transfer due to dust or dirt adhering to the surface of the master information carrier can be suppressed.

BRIEF DESCRIPTION OF THE DRAWINGS

FIG. 3A shows a modification of the second sealing portion in an open state of the holder, and FIG. 3B shows the modification of the second sealing portion in a closed state of the holder.

DESCRIPTION OF THE PREFERRED EMBODIMENTS

Figure 1:
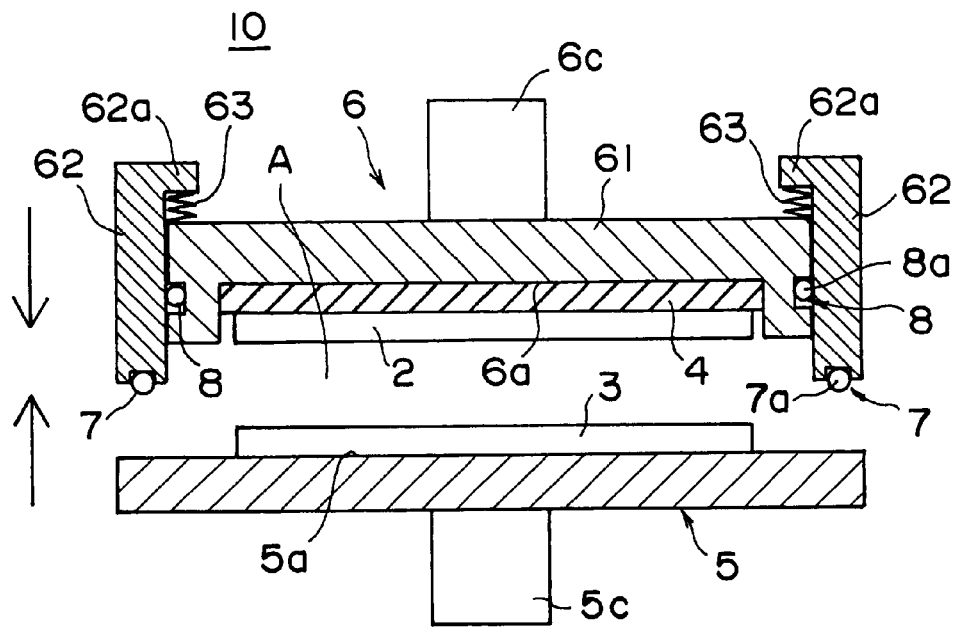
FIG. 1 is a cross-sectional view showing in brief a holder for a magnetic transfer apparatus in accordance with an embodiment of the present invention in an open state.

A holder 10 for a magnetic transfer apparatus in accordance with an embodiment of the present invention comprises a chamber base 5 and a chamber body 6 which are movable toward and away from each other. When the chamber base 5 and the chamber body 6 are brought into contact with each other, an inner space A is formed therebetween. A slave medium 2, a master information carrier 3 and an elastic member 4 are disposed in the inner space A and the slave medium 2 and the master information carrier 3 are brought into close contact with each other with their centers aligned with each other.

Though not shown, the magnetic transfer apparatus is provided with a vacuum means which evacuates the inner space A to a vacuum and a magnetic field application system which applies a transfer magnetic field to the holder 10 while rotating the holder 10.

Figure 2:
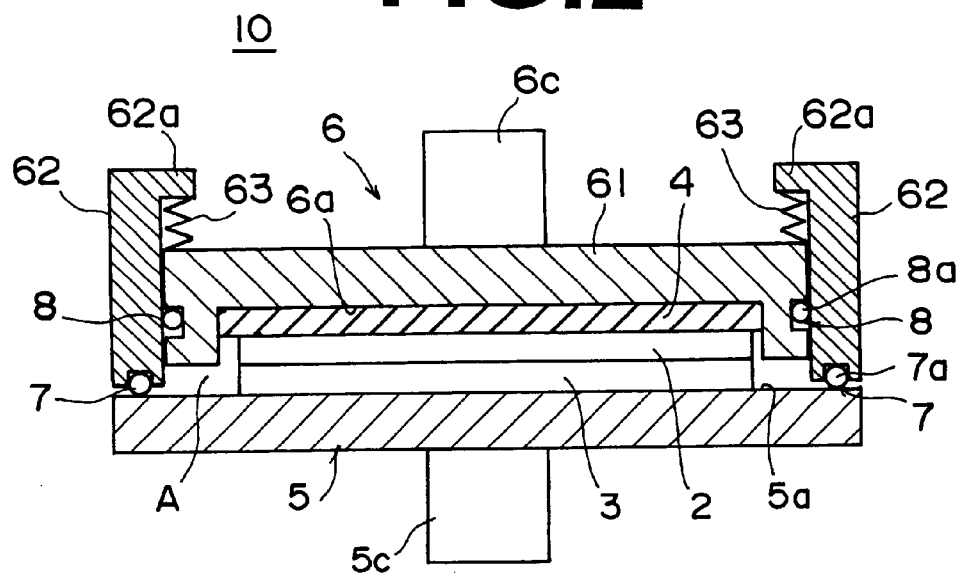
FIG. 2 is a cross-sectional view showing in brief the holder for a magnetic transfer apparatus in a closed state.

Though the holder 10 shown in FIGS. 1 and 2 is for horizontally holding a slave medium 2 with a master information carrier 3 held in close contact with one side of the slave medium 2 so that information on a master information carrier 3 is magnetically transferred to sides of the slave medium 2 in sequence, it is possible to arrange the holder of the present invention to vertically hold the slave medium 2. Further, it is possible to arrange the holder of the present invention so that a master information carrier 3 is held in close contact with each side of a slave medium 2 and two pieces of information carried by both the master information carriers 3 are magnetically transferred to both the sides of the slave medium 2 at one time. The expression "the slave medium 2 and the master information carrier 3 are held in close contact with each other" as used here should be broadly interpreted to include a case where the slave medium 2 and the master information carrier 3 are opposed to each other with a fine space intervening therebetween as well as a case where the slave medium 2 and the master information carrier 3 are opposed to each other with no space intervening therebetween.

The chamber base 5 is like a disc in shape and has a circular inner surface (pressing face) 5a larger than the outer diameter of the master information carrier 3 and holds the lower side of the master information carrier 3 at the center of the inner surface 5a, for instance, by suction force.

The chamber body 6 is formed by a pressing disc portion 61 and a side wall portion 62. The pressing disc portion 61 is like a disc in shape and has an outer diameter smaller than that of the chamber base 5. The pressing disc portion 61 has an inner surface (pressing face) 6a larger than the outer diameter of the slave medium 2 at the center thereof and the elastic member (cushioning material) 4 is mounted on the inner surface 6a. The slave medium 2 is held on the lower side of the elastic member 4, for instance, by suction force.

The side wall portion 62 is like a cylinder extending in the axial direction of the chamber body 6 and is fitted on the pressing disc portion 61 so that the pressing disc portion 61 is slidable along the side wall portion 62 toward and away from the chamber base 5. The side wall portion 62 is substantially equal to the chamber base 5 in the outer diameter and the axial length (height) of the side wall portion 62 is larger than the thickness (height) of the pressing disc portion 61. The side wall portion 62 is provided at its top end with an annular flange portion 62a projecting over the pressing disc portion 61. An urging member 63 in the form of a tensile spring is disposed between the lower surface of the flange portion 62a and the upper surface of the pressing disc portion 61.

A first sealing portion 7 is disposed on the lower end face of the side wall portion 62 of the chamber body 6. The first sealing portion 7 seals between the lower end face of the side wall portion 62 and the inner surface (upper surface) 5a of the chamber base 5. That is, an O-ring 7a is mounted on the lower end face of the side wall portion 62 to be pressed against the inner surface 5a of the chamber base 5 and the inner space A formed by the chamber base 5 and the chamber body 6 is sealed by the sealing member (O-ring) 7a. The sealing member 7a may be mounted on the chamber base 5.

A second sealing portion 8 is disposed on the outer peripheral surface of the pressing disc portion 61. The second sealing portion 8 seals between the outer peripheral surface of the pressing disc portion 61 and the inner peripheral surface of the side wall portion 62 while allowing the chamber base 5 and the chamber body 6 to slide toward and away from each other with the inner space A kept sealed. That is, an O-ring 8a is mounted on the outer peripheral surface of the pressing disc portion 61 to be pressed against the inner peripheral surface of the side wall portion 62 and the inner space A formed by the chamber base 5 and the chamber body 6 is sealed by the sealing member (O-ring) 8a while the pressing disc member 61 and the side wall portion 62 are sliding relatively to each other. The sealing member 8a may be mounted on the side wall portion 62.

The urging member 63 urges the side wall portion 62 toward the chamber base 5 from the pressing disc portion 61 so that the side wall portion 62 is held in the lowermost position when the chamber body 6 is away from the chamber base 5.

In the second sealing portion 8, a magnetic fluid seal which generates no dust or dirt may be employed in place of the O-ring 8a. A magnetic fluid seal and an O-ring may be employed together. Also in the first sealing portion 7, a magnetic fluid seal may be employed, whereby generation of dust or dirt from the sealing portions can be further suppressed. Other sealing mechanism may be employed.

The second sealing portion 8 may comprise bellows 11 as show in FIGS. 3A and 3B.

The chamber base 5 and the chamber body 6 are respectively provided with support shafts 5c and 6c which are respectively erected at the center of the lower surface of the chamber base 5 and the center of the upper surface of the pressing disc portion 61 of the chamber body 6. The support shafts 5c and 6c are respectively supported by the magnetic transfer apparatus (not shown). The chamber base 5 and the chamber body 6 are integrally rotated about the shafts 5c and 6c by a rotating mechanism (not shown).

Though not shown, a suction port for evacuating the inner space A opens in the inner surface 5a of the chamber base 5 to communicate with the inner space A. An air passage communicated with the suction port is formed through the chamber base 5 and connected to a vacuum pump (not shown) through the support shaft 5c. The chamber body 6 may be provided with a suction port to evacuate the inner space A through both the suction ports in the chamber base 5 and the chamber body 6. The inner space A of the holder 10 is evacuated to a predetermined degree of vacuum, whereby the slave medium 2 and the master information carrier 3 are brought into close contact with each other and air between the contact surfaces is purged. By making the areas (the effective suction areas) the inner surfaces 5a and 6a larger than the contact area between the slave medium 2 and the master information carrier 3, for instance, two to three times as large as the contact area between the slave medium 2 and the master information carrier 3, the contact force acting between the slave medium 2 and the master information carrier 3 can be a desired pressure.

The magnetic transfer apparatus may be further provided with a mechanical pressing means which mechanically presses the pressing disc portion 61 of the chamber body 6 against the chamber base 5. For example, the mechanical pressing means may comprise a pressure cylinder having a pressure rod which presses the support shaft 6c of the pressing disc portion 61 under the pressure of the pressure cylinder.

When at least one of the chamber base 5 and the chamber body 6 is axially (up and down in FIGS. 1 and 2) movable so that the chamber base 5 and the chamber body 6 are movable toward and away from each other and the chamber base 5 and the chamber body 6 are closed as shown in FIG. 2 from the open state shown in FIG. 1, the sealing member 7a of the first sealing portion 7 is brought into contact with the inner surface 5a of the chamber base 5 to hermetically seal the inner space A before the slave medium 2 is brought into close contact with the master information carrier 3. After the inner space A is hermetically sealed, the inner space A is evacuated to a vacuum, and the pressing disc portion 61 is moved toward the chamber base 5 along the side wall portion 62, whereby the inner space A is narrowed and the urging member 63 is expanded with the inner space A held hermetically sealed. In this manner, the slave medium 2 contained in the inner space A hermetically sealed by the first and second sealing portions 7 and 8 is pressed against the master information carrier 3 and is brought into close contact with the same as shown in FIG. 2. The slave medium 2 may be first set on the master information carrier 3.

The holder 10 of this embodiment is advantageous in that the inner space A can be held hermetically sealed even if the slave medium 2, the master information carrier 3 and the elastic member 4 change in thickness. Though, in the embodiment described above, the slave medium 2 is held by a cylinder-like holder half and the master information carrier 3 is held by a plate-like holder half, the master information carrier 3 may be held by a cylinder-like holder half provided with the second sealing portion.

When magnetic transfer is effected by the use of the holder 10 described above, the slave medium 2 is initially DC-magnetized in the direction of in-plane tracks (in-plane recording) or in a direction perpendicular to the slave medium 2 (perpendicular recording). Then the initially DC-magnetized slave medium 2 is brought into close contact with the master information carrier 3 and a transfer magnetic field is applied to the slave medium 2 and the master information carrier 3 in close contact with each other in the direction opposite to the initial DC-magnetization.

The slave medium 2 is a disc-like magnetic recording medium such as a hard disc or a high density flexible disc provided with a magnetic layer on one side thereof or both the sides thereof. The magnetic layer may be a coated magnetic layer or a metal-film type magnetic layer.

The master information carrier 3 is like a disc in shape and comprises a substrate provided with a fine irregularity pattern formed on one side thereof and a soft magnetic layer formed on the irregularity pattern. The side on which the irregularity pattern and the soft magnetic layer are provided is brought into close contact with the magnetic layer of the slave medium 2 and information represented by the irregularity pattern is transferred to the slave medium 2 by magnetic transfer. The other side of the master information carrier 3 is held by the chamber base 5 under suction force. The substrate of the master information carrier 3 may be of, for instance, nickel, silicon, quartz, glass, aluminum, alloy, ceramics or synthetic resin. The irregularity pattern is formed, for instance, by stamper method. The soft magnetic layer may be formed, for instance, by vacuum film forming method or a plating method such as vacuum deposition, sputtering, or ion-plating of magnetic material. The master information carrier 3 for in-plane recording and the master information carrier 3 for perpendicular recording may be substantially the same.

The elastic member 4 mounted on the chamber body 6 is brought into contact with the back surface (upper surface) of the slave medium to uniformly press the slave medium 2 and formed of elastic material such as normal rubber e.g., silicone rubber, polyurethane rubber, fluororubber and butadiene rubber, or foamed resin such as sponge rubber.

The magnetic field application system for applying the transfer magnetic field (and/or the initial magnetic field) comprises, for instance, a pair of ring-type electromagnet units, each comprising a core having a gap extending in a radial direction of the slave medium 2 and a winding wound around the core, which are disposed on opposite sides of the holder 10 to generate magnetic fields in the same direction parallel to the recording tracks (in the case of in-plane recording). The holder 10 is rotated so that the magnetic field is applied over the entire area of the slave medium 2 and the master information carrier 3. It is possible to arrange the apparatus so that the magnetic field application system is rotated. The electromagnet unit may be disposed only on one side of the holder 10. A permanent magnet unit may be employed in place of the electromagnet unit. In the case of the perpendicular recording, a pair of electromagnet units or permanent magnet units which are opposite in polarity are disposed on opposite sides of the holder 10 so that a magnetic field is generated in perpendicular to the holder 10. When the magnetic field acts only a part of the holder 10, the holder 10 or the magnetic field is moved relatively to the other so that the magnetic field is applied over the entire area of the slave medium 2 and the master information carrier 3.

The magnetic transfer steps will be described hereinbelow. The holder 10 of this embodiment is for effecting magnetic transfer from one master information carrier 3 to a plurality of slave media 2. The master information carrier 3 and the elastic member 4 are set in place to the chamber base 5 and the chamber body 6. With the chamber base 5 and the chamber body 6 held in a open state, a slave medium 2 which has been initially magnetized is set in the holder 10 and the chamber body 6 is moved toward the chamber base 5.

When the first sealing member 7a on the chamber body 6 is brought into contact with the chamber base 5, the inner space A is closed and hermetically sealed by the first and second sealing portions 7 and 8. Before the slave medium 2 and the master information carrier 3 are pressed against each other, the inner space A is evacuated to a predetermined degree of vacuum and the pressing disc portion 61 is slid toward the chamber base 5 along the side wall portion 62 with the gap between the outer peripheral surface of the pressing disc portion 61 and the inner peripheral surface of the side wall portion 62 kept sealed by the second sealing portion 8. When the slave medium 2 is brought into abutment against the back side of the master information carrier 3, the atmospheric pressure acting on the holder 10 according to the degree of vacuum inside the inner space A uniformly presses the slave medium 2 and the master information carrier 3 toward the chamber base 5 by way of the elastic member 4.

Thereafter the magnetic field application system is moved toward the holder 10 and a transfer magnetic field is applied to the holder 10 in a direction substantially opposite to the direction of the initial magnetization while rotating the holder 10, whereby a magnetization pattern corresponding to the pattern on the master information carrier 3 is recorded on the magnetic layer of the slave medium 2.

That is, the transfer magnetic field is absorbed by the protrusion pattern of the soft magnetic layer of the master information carrier 3 in close contact with the slave medium 2 and the initial magnetization at this part is not reversed with the magnetization at the other part reversed in the case of the in-plane recording whereas the initial magnetization at this part is reversed with the magnetization at the other part not reversed in the case of the perpendicular recording, whereby a magnetization pattern corresponding to the pattern on the master information carrier 3 is recorded on the magnetic layer of the slave medium 2.

In accordance with the holder 10 of this embodiment, since the first sealing portion 7 for hermetically sealing the inner space A of the holder 10 and the second sealing portion 8 allowing the pressing faces of the chamber base 5 and the chamber body 6 to move toward and away from each with the inner space A kept hermetically sealed are separately formed in different positions, the load on the first sealing member 7a and the second sealing member 8a is lightened, which results in improved durability. Further, wear of the sealing member can be reduced in both the first and second sealing portions 7 and 8 and generation of dust or dirt can be suppressed, whereby good magnetic transfer can be ensured for a long time and change of the sealing member can be less frequent, which results in high working efficiency and an elongated service life of the master information carrier 3.

What is claimed is:

1. A holder for magnetic transfer comprising a chamber base and a chamber body which are moved toward and away from each other and form therebetween an inner space in which a master information carrier and a slave medium are accommodated and held in close contact with each other, wherein the improvement comprises that the holder is provided at different parts with a first sealing portion for sealing the inner space between the chamber base and the chamber body and a second sealing portion allowing the pressing faces of the chamber base and the chamber body to move toward each other to press the master information carrier and the slave medium against each other with the inner space kept sealed.

2. A holder as defined in claim 1 in which an O-ring is used as a sealing member in the first and second sealing portions.

3. A holder as defined in claim 1 in which a magnetic fluid seal is employed as a sealing member in the second sealing portion.

4. A holder as defined in claim 3 in which a magnetic fluid seal and an O-ring are employed together in the second sealing portion.

5. A holder as defined in claim 1 in which a seal comprising bellows is employed as a sealing member in the second sealing portion.

6. A holder as defined in claim 1 in which the chamber body is divided into a pressing disc portion and a side wall portion so that the pressing disc portion slides along the side wall portion toward the chamber, and the first sealing portion is disposed between the end surface of the side wall portion and the chamber base with the second sealing portion disposed between the pressing disc portion and the side wall portion of the chamber body.

7. A holder as defined in claim 6 in which an urging member is provided to urge the side wall portion toward the chamber base from the pressing disc portion.

\* \* \* \* \*